(12) United States Patent
Holland (10) Patent No.: US 8,238,934 B2
(45) Date of Patent: *Aug. 7, 2012

(54) WIRELESS REMOTE LOCATION SYSTEM AND METHOD

(76) Inventor: Bryan Holland, Huntington Beach, CA (US)

( * ) Notice: Subject to any disclaimer, the term of this patent is extended or adjusted under 35 U.S.C. 154(b) by 580 days.

This patent is subject to a terminal disclaimer.

(21) Appl. No.: 12/054,070

(22) Filed: Mar. 24, 2008

(65) Prior Publication Data

US 2008/0220794 A1    Sep. 11, 2008

Related U.S. Application Data

(63) Continuation of application No. 10/268,035, filed on Oct. 8, 2002, now Pat. No. 7,349,705, which is a continuation of application No. 09/975,898, filed on Oct. 10, 2001, now Pat. No. 7,016,687, which is a continuation of application No. 09/364,557, filed on Jul. 29, 1999, now Pat. No. 6,321,091.

(51) Int. Cl.
*H04Q 7/20* (2006.01)

(52) U.S. Cl. ............ 455/456.1; 455/456.2; 455/456.3; 455/456.5; 455/456.9; 455/457; 342/357.25; 342/357.22; 342/357.21; 342/357.39

(58) Field of Classification Search ....... 455/456.1–457, 455/412.1, 412.2, 403, 422.1, 414.1–414.4, 455/500, 517, 426.1, 426.2, 556.1, 556.2; 342/357.01, 357.06, 357.07, 357.12, 357.13; 709/202, 203, 219, 218
See application file for complete search history.

(56) References Cited

U.S. PATENT DOCUMENTS

| | | |
|---|---|---|
| 4,601,005 A | 7/1986 | Kilvington et al. |
| 5,014,040 A | 5/1991 | Weaver et al. |
| 5,043,736 A | 8/1991 | Darnell et al. |
| 5,119,102 A | 6/1992 | Barnard et al. |
| 5,122,959 A | 6/1992 | Nathanson et al. |
| 5,129,605 A | 7/1992 | Burns et al. |
| 5,225,842 A | 7/1993 | Brown et al. |
| 5,235,633 A | 8/1993 | Dennison et al. |
| 5,289,163 A | 2/1994 | Perez et al. |
| 5,317,323 A | 5/1994 | Kennedy et al. |
| 5,323,163 A | 6/1994 | Maki |
| 5,379,320 A | 1/1995 | Fernandes et al. |
| 5,388,147 A | 2/1995 | Grimes |
| 5,416,797 A | 5/1995 | Gilhousen et al. |
| 5,418,538 A | 5/1995 | Lau |
| 5,420,592 A | 5/1995 | Johnson |
| 5,448,773 A | 9/1995 | McBurney et al. |
| 5,461,365 A | 10/1995 | Schlager et al. |
| 5,461,390 A | 10/1995 | Hoshen |
| 5,483,549 A | 1/1996 | Weinberg et al. |
| 5,519,403 A | 5/1996 | Bickley et al. |
| 5,543,789 A | 8/1996 | Behr et al. |
| 5,546,445 A | 8/1996 | Dennison et al. |
| 5,576,716 A | 11/1996 | Sadler |
| 5,576,952 A | 11/1996 | Stutman et al. |
| 5,617,074 A | 4/1997 | White |

(Continued)

FOREIGN PATENT DOCUMENTS

CA         1277400       12/1990

(Continued)

*Primary Examiner* — Keith Ferguson (74) *Attorney, Agent, or Firm* — Stroock & Stroock & Lavan LLP (57) ABSTRACT

A wireless subscriber unit for a tracking and locating system and method is disclosed. The locating system provides positional information of remote locator devices in the form of images viewable by subscribers over a network.

12 Claims, 3 Drawing Sheets

U.S. PATENT DOCUMENTS

| | | |
|---|---|---|
| 5,627,548 A | 5/1997 | Woo et al. |
| 5,629,678 A | 5/1997 | Gargano et al. |
| 5,636,122 A | 6/1997 | Shah et al. |
| 5,652,570 A | 7/1997 | Lepkofker |
| 5,657,008 A | 8/1997 | Bantli |
| 5,663,734 A | 9/1997 | Krasner |
| 5,712,619 A | 1/1998 | Simkin |
| 5,731,757 A | 3/1998 | Layson, Jr. |
| 5,731,785 A | 3/1998 | Lemelson et al. |
| 5,734,981 A | 3/1998 | Kennedy, III et al. |
| 5,742,233 A | 4/1998 | Hoffman et al. |
| 5,748,148 A | 5/1998 | Heiser et al. |
| 5,757,916 A | 5/1998 | MacDoran et al. |
| 5,802,492 A | 9/1998 | DeLorme et al. |
| 5,812,087 A | 9/1998 | Krasner |
| 5,815,814 A | 9/1998 | Dennison et al. |
| RE35,916 E | 10/1998 | Dennison et al. |
| 5,835,907 A | 11/1998 | Newman |
| 5,838,237 A | 11/1998 | Revell et al. |
| 5,892,454 A | 4/1999 | Schipper et al. |
| 5,914,675 A | 6/1999 | Tognazzini |
| 5,917,433 A | 6/1999 | Keillor et al. |
| 5,929,806 A | 7/1999 | Birchler et al. |
| 5,946,611 A | 8/1999 | Dennison et al. |
| 6,014,080 A | 1/2000 | Layson, Jr. |
| 6,028,537 A | 2/2000 | Suman et al. |
| 6,085,097 A | 7/2000 | Savery et al. |
| 6,112,078 A | 8/2000 | Sormunen et al. |
| 6,115,611 A | 9/2000 | Kimoto et al. |
| 6,121,922 A | 9/2000 | Mohan |
| 6,122,521 A | 9/2000 | Wilkinson et al. |
| 6,131,067 A | 10/2000 | Girerd et al. |
| 6,133,871 A | 10/2000 | Krasner |
| 6,167,277 A | 12/2000 | Kawamoto et al. |
| 6,169,902 B1 | 1/2001 | Kawamoto et al. |
| 6,201,973 B1 | 3/2001 | Kowaguchi et al. |
| 6,243,039 B1 | 6/2001 | Elliot |
| 6,243,647 B1 | 6/2001 | Berstis et al. |
| 6,321,091 B1 | 11/2001 | Holland |
| 6,324,404 B1 | 11/2001 | Dennison et al. |
| 6,349,201 B1 | 2/2002 | Ford |
| 6,377,810 B1 | 4/2002 | Geiger et al. |
| 6,421,608 B1 | 7/2002 | Motoyama et al. |
| 6,456,852 B2 | 9/2002 | Bar et al. |
| 6,838,996 B2 | 1/2005 | Deimel |
| 6,847,822 B1 | 1/2005 | Dennison et al. |
| 2002/0059296 A1 | 5/2002 | Hayashi et al. |
| 2005/0075114 A1 | 4/2005 | Dennison et al. |

FOREIGN PATENT DOCUMENTS

| | | |
|---|---|---|
| EP | 0242099 | 10/1987 |
| EP | 0379198 | 7/1990 |
| EP | 0512789 | 11/1992 |
| EP | 0601293 | 6/1994 |
| WO | 94/28434 | 12/1994 |
| WO | 97/14049 | 4/1997 |
| WO | 97/14054 | 4/1997 |
| WO | 99/56144 | 11/1999 |

WIRELESS REMOTE LOCATION SYSTEM AND METHOD

CROSS-REFERENCE TO RELATED APPLICATIONS

This application is a continuation of U.S. patent application Ser. No. 10/268,035, filed Oct. 8, 2002, now U.S. Pat. No. 7,349,705, which is a continuation of U.S. patent application Ser. No. 09/975,898, filed Oct. 10, 2001, now U.S. Pat. No. 7,016,687, which is a continuation of U.S. patent application Ser. No. 09/364,557, filed Jul. 29, 1999, now U.S. Pat. No. 6,321,091.

BACKGROUND OF THE INVENTION

1. Field of the Invention

This disclosure pertains generally to locating and tracking systems.

2. The Prior Art

Wireless devices of all kinds have been in use for pinpointing objects, people and animals on the surface of the earth, under water, or in space. Some wireless devices also provide navigational information such as whether or not a moving vessel or vehicle is "on course" to its predetermined destination. Radio frequency (RF) location and navigation systems are the oldest, and more recently developed devices function at infrared (IR) and visible wavelengths. Acoustic location and navigation systems such as sonar also exist.

Traditional radiolocation is the process of determining the position of a vehicle, aircraft, or vessel. Radionavigation is the use of radio apparatus, by personnel aboard moving vessels, for the purpose of plotting and maintaining a course.

The simplest method of radiolocation is known as the "directional method" wherein two or more fixed receiving stations, which are separated by a fixed distance, receive radio transmission signals from a transmitter that is mounted on a vessel. The vessel location is determined from the intersection of great circles drawn outward from the receiver station points in the appropriate directions.

A second implementation for determining the position of objects involves radar. The term "radar" is an acronym derived from the words "radio detection and ranging." Electromagnetic (EM) waves having certain frequencies reflect from various objects, particularly if those objects contain metals or other electrical conductors. Using a transmitter, receiver, and a display at a fixed station, the location of flying objects with respect to the fixed location may be determined by ascertaining the directions from which radio signal are returned, and by measuring the time it takes for an EM pulse to travel from the transmitter to a target and back. However, such radar systems are not useful for tracking a ground moving objects, or objects which have poor EM reflective properties. Additionally, radar systems are not normally useful for differentiating the identity of objects, particularly when there are a plurality of objects.

The most sophisticated radiolocation and radionavigation techniques employ the global positioning system (GPS). The GPS is a network of radiolocation and radionavigation apparatus that operates on a worldwide basis. The GPS system employs several satellites and allows determination of latitude, longitude, and altitude.

Most recently, vehicle location and navigation systems have been adapted to track the location of automobiles using the GPS system. Such systems include sensors which are fixed to the automobile and draw power from either the car battery or a second large power source. The purpose of fixing the automobile tracking sensor to the vehicle is primarily for security reasons. Because one main purpose of the tracking system to locate the vehicle in cases of theft, it is important that the sensor systems of the tracking systems be mounted or otherwise fixed to the vehicle, making such sensor systems not easily removed or transportable from a first object to a second object. Furthermore, because a large power source such as a car battery is normally available to such tracking systems, intelligent power saving or conserving features are not provided.

Accordingly, there is a need for a tracking and locating system and method which provides for a lightweight and portable tracking locator device, which is easily transferable from user to user or object to object, which provides power saving and conserving features associated with the locator device, and which further provides positional information of such locator devices in the form of hypertext markup language pages viewable on the Internet. The present invention satisfies these needs, as well as others, and generally overcomes the deficiencies found in the background art.

BRIEF DESCRIPTION OF THE DRAWINGS

The present invention will be more fully understood by reference to the following drawings, which are for illustrative purposes only.

DETAILED DESCRIPTION OF THE PREFERRED EMBODIMENTS

Figure 1:
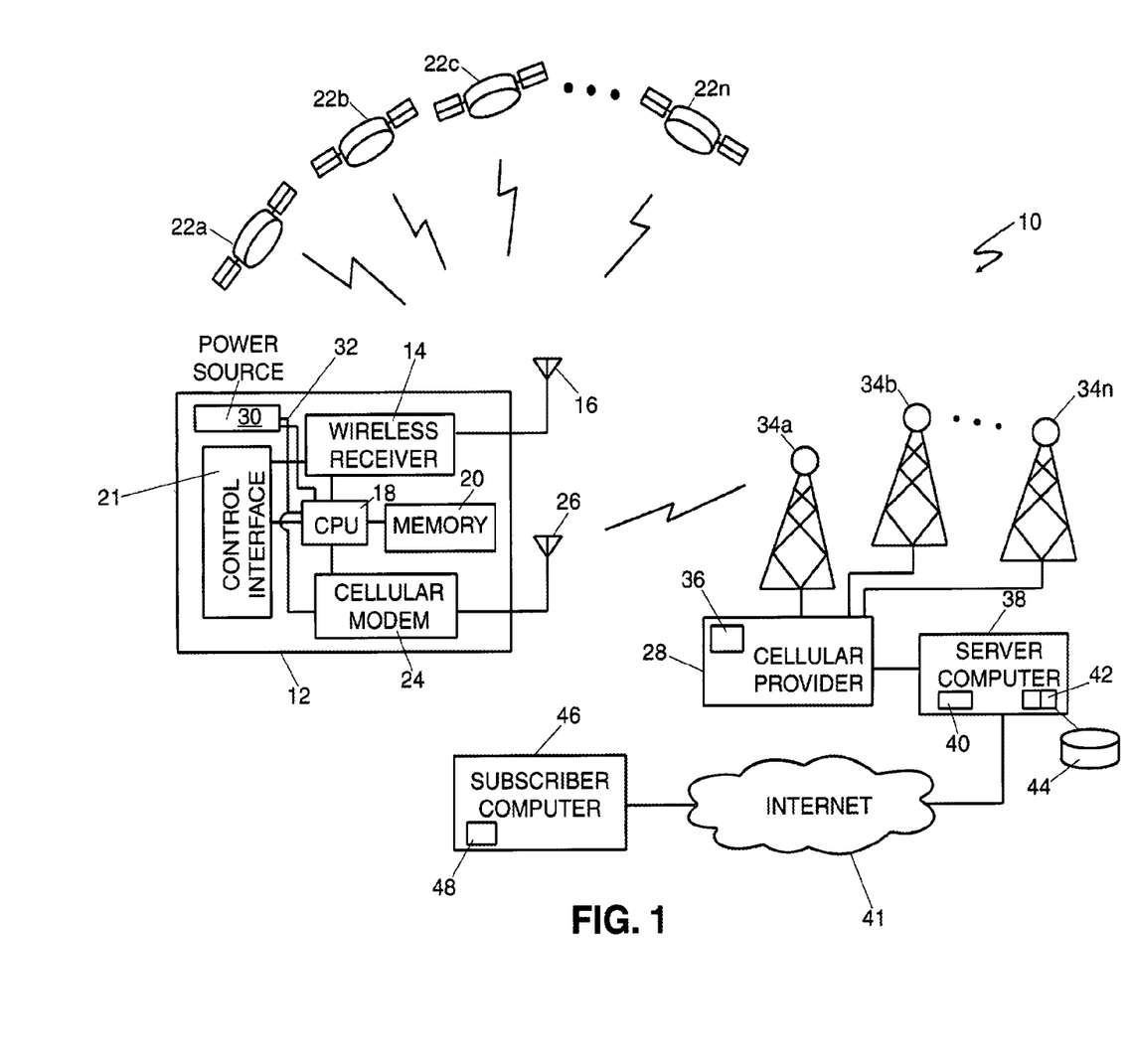
FIG. 1 is a block diagram of a locating system in accordance with the present invention.
Figure 2:
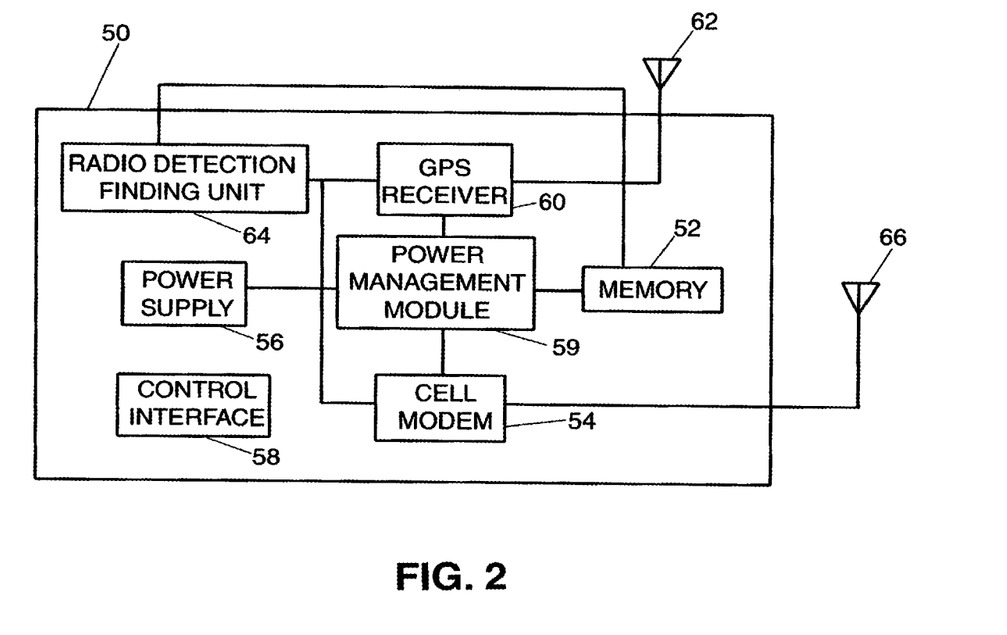
FIG. 2 is a block diagram of an alternative portable locator device.
Figure 3:
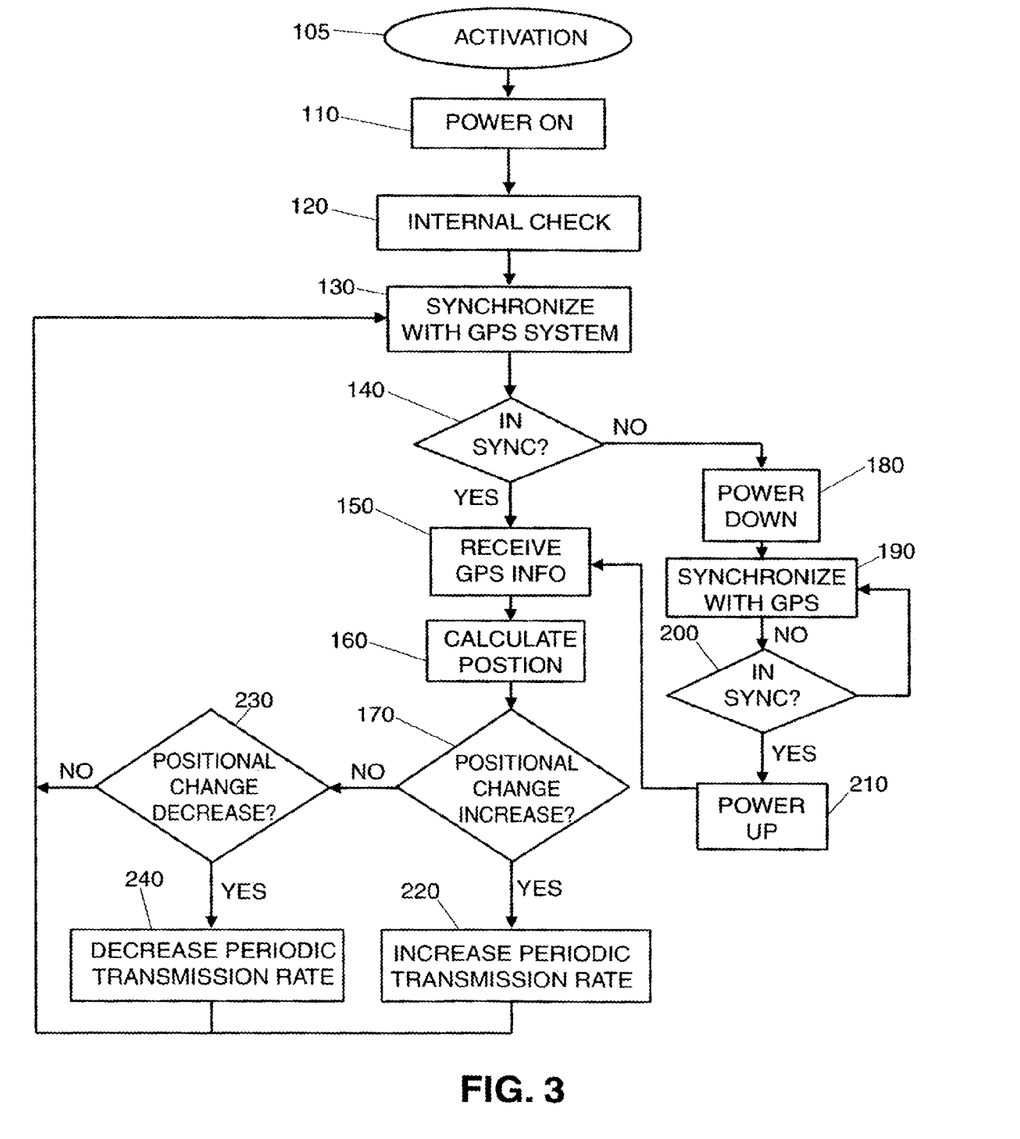
FIG. 3 is a flowchart showing generally the steps involved in carrying out the power management means of the invention.

Referring more specifically to the drawings, for illustrative purposes the present invention is embodied in the system shown FIG. 1 through FIG. 2 and the method outlined in FIG. 3. It will be appreciated that the apparatus may vary as to configuration and as to details of the parts, and that the method may vary as to details and the order of the steps, without departing from the basic concepts as disclosed herein. The invention is disclosed generally in terms of a tracking and locating system and method, although numerous other uses for the invention win suggest themselves to persons of ordinary skill in the art.

Referring first to FIG. 1, there is shown generally a block diagram of a tracking and locating system 10 in accordance with the invention. The system 10 comprises a locator device 12 having means for generating positional information of the locator device. The present system is configured to locate and track one or more locator devices, each operating as locator device 12 as described herein, and each having a unique identifier or serial number associated therewith. The positional information generating means comprises a receiver 14 connected to an antenna 16 and a central processing unit (CPU) 18 connected to memory 20. The receiver 14 is operatively coupled for communication with the CPU 18.

A control interface 21 is provided to accept input commands from a user of the locator device 12. The control interface 21 in connected to the CPU 18 for processing of input commands issued at the control interface 21 by the user of locator device 12 and to a power source 30 for providing typical activation means for the locator device 12.

The antenna 16 comprises a standard radio-frequency (RF) transducer as is known in the art for receiving electromagnetic wave signals from a plurality of visible radiolocation transmitters. The term "visible" refers to the ability of the locator device to receive synchronization signals and timing signals and other informational data from the radiolocation transmitter. In the preferred embodiment, the radiolocation transmitters comprise global positioning system (GPS) satellites 22a through 22n, although land-based radiolocation transmitters may also be used. The GPS satellites transmit signals in the UHF part of the radio spectrum, thus the antenna 16 of the preferred embodiment is structured and configured to receive signals in the UHF frequency range.

The receiver 14 comprises standard circuit stage components or like hardware for detecting and receiving radio frequency signals as in known in the art and carries out the operation of scanning, the input stream received by antenna 16 and demodulating GPS signal data into serial data for use by the CPU 18. In an illustrative embodiment the receiver unit 14 is an ASHTECH® G-8 model unit. This serial data produced by the receiver unit 14 is then communication to the CPU 18 for further processing as described in more detail below.

GPS satellites 22a through 22n transmit signals having special codes containing information used by various receiving apparatus for calculating position. The CPU includes program means running thereon for determining the location of the locator device 12 as in known in the art. In general, the CPU 18 calculates the distance between the locator device 12 and the GPS satellites 22a through 22n using the timing signals provided by the GPS satellites 22a through 22n, and carries out standard radiolocation calculations to formulate "positional data" which is the location of the locator device 12 relative to the positions of the GPS satellites 22a through 22n. The timing signals as well as the positions of the GPS satellites are communicated to the locator device 12 though the code signals transmitted by the GPS satellites 22a through 22n. The positional data formulated by the CPU 18 includes latitude, longitude, and altitude information about the locator device 12. The positional data formulated by the CPU 18 is further maintained or recorded in a log in the memory 20 for later computation as described in conjunction with FIG. 3. The CPU 18 also carries out the operation periodically communicating the computed positional data to a wireless modem device for further transmission as described below.

The locator device 12 further comprises a cellular modem 24 operatively coupled the CPU 18. The cellular modem 24 includes an antenna 26 and may be any cellular modem or personal communication services (PCS) modem, however a cellular modem is preferred because of the pervasiveness of cellular service availability. In an illustrative embodiment, the cellular modem 24 comprises a MOTOROLA® 505sd modem. The cellular modem 24 carries out the operation of transmitting the positional data received from the CPU 18 and communicating such positional data to a wireless service provider. Preferably the wireless service provider is a cellular service provider 28. The cellular frequency for such communication is typically designated by the cellular provider 28.

The locator device 12 also comprises a power source 30 provided therein. The power source 30 is normally a standard battery. The power source 30 provides power to the various elements of the locator device 12 including the receiver 14, the CPU 18, the memory 20 and the cellular modem 24. The CPU 18 communicates with power source 30 via line 32 and includes program means residing thereon for managing power usage and consumption of device 12 as described below in conjunction with FIG. 3.

Preferably, the receiver 14, the CPU 18, the memory 20, the cellular modem 24 are mounted on a circuit board or like hardware device and is housed within a casing unit (not shown). The power source 30 is also provided within the casing unit. The control interface 21 may be provided integral with the casing unit or provided on the outer surface of the casing unit and preferably includes switches or other similar controls (not shown) for accepting external input from a user of the locator device 12.

The cellular provider 28 is in wireless communication with the locator device 12 via radio signals transmitted by the cellular modem 24 for the purposes of receiving the positional data information transmitted the by locator device 12. As noted above, in the preferred embodiment, the wireless modem of locator device 12 comprises cellular modem 24, and the wireless service provider is cellular provider 28. Generally, cellular provider 28 comprises a network of antennas 34a through 34n each of which includes means for receiving from and transmitting data to the cellular modem 24 as is generally known in the art. A base device 36 is provided with the cellular provider 28 and is operatively coupled to the receiving and transmitting means of the antennas 34a through 34n thus forming a "cellular network". The base device 36 includes means for managing the communication exchange of the devices participating in the cellular network as in known in the art. The cellular provider 28 communicates positional data received from the locator device 12 to a server computer 38 for further processing.

The server computer 38 comprises a standard computer such as a minicomputer, a microcomputer, a UNIX® machine, mainframe machine, personal computer (PC) such as INTEL®, APPLE®, or SUN® based processing computer or close thereof, or other appropriate data processing means. Server computer 38 also includes typical components (not shown), such as a motherboard, central processing unit (CPU), random access memory (RAM), hard disk drive, display adapter, other storage media such as diskette drive, CD-ROM, flash-ROM, tape drive, PCMCIA cards and/or other removable media, a monitor, keyboard, mouse and/or other user interface means, a modem, network interface card (NIC), and/or other conventional input/output devices.

The server computer 38 is operatively coupled with the cellular provider 28 to receive positional data information, normally through a fast data connection means, such as T1, T3, multiple T1, multiple T3, or other high-speed conventional data connection means. Server computer 38 and cellular provider 28 can alternatively connect to each other using a standard Internet connection means, cable means, telephone means, wireless means, or other means for establishing a communication network. Server computer 38 is also operatively coupled to the Internet shown generally as 41 via a fast connection means, such as T1, T3, multiple T1, multiple T3, or other high-speed conventional data connection means. Alternative methods for connection server computer 38 to the Internet as is known in the art may also be used.

Server computer 38 also has loaded in it RAM a conventional server operation system (not shown) such as UNIX, WINDOWS NT, NOVELL, SOLARIS, or other server operating system. Server computer also has loaded in its RAM web server software 40 and database software 42. The web server software 40 carries out the operation of handing hypertext transfer protocol (HTTP) or Web page request as described further below.

The database software 42 carries out the operation of storing, retrieving, accessing, deleting and updating database information stored in database 44. The database 44 contains information related to each locator device 12 of the system 10.

Positional data information about locator devices is stored in a tracking table (not shown) within the database 44.

The tracking table includes, for example, a plurality of LID numbers corresponding to each locator device's identifying code or serial number, data location information such as latitude, longitude, and altitude, the date and time when such data location information was entered, and other pertinent information associated with each LID number. Subscriber data information about subscriber users are stored in a subscriber table (not shown) within the database 44.

The subscriber table includes, for example, a plurality of SID number corresponding to each subscriber user, with a username or screen name, e-mail address, password, the LID or locator devices the subscriber may track, and other pertinent subscriber user information. The subscriber table is related to the tracking table via the common LID field residing in both tables. Thus positional data information related to a subscribe SID in the subscriber table may be obtained by querying the positional data information in the corresponding LID field in the tracking table.

As positional data is received by server computer 38 from the cellular provider 28, the database software 42 parses the data information into locator device identity information and positional data information, and stores such information along with the current date and time into the corresponding fields in the tracking table. Thus the tracking table constantly maintains current positional data information of the various locator devices participating in the system 10.

A subscriber computer 46 is provided in the system for allowing a subscriber user wishing to track a particular locator device. Subscriber computer 46, like server computer 38, preferably comprises as standard computer such as a minicomputer, a microcomputer, a UNIX® machine, mainframe machine, personal computer (PC) such as INTEL®, APPLE®, or SUN® based processing computer or close thereof, or other appropriate data processing means.

Server computer 38 also includes typical components (not shown), such as a motherboard, central processing unit (CPU), random access memory (RAM), hard disk drive, display adapter, other storage media such as diskette drive, CD-ROM, flash-ROM, tape drive, PCMCIA cards and/or other removable media, a monitor, keyboard, mouse and/or other user interface means, a modem, and/or other conventional input/output devices. Subscriber computer 46 also loaded in its RAM an operating system (not shown) such as UNIX, WINDOWS 98 or the like.

Subscriber computer 46 further has loaded in ram a Web browser program 48 such as NETSCAPE, INTERNET EXPLORER, AOL, or like browsing software for client subscriber computers. Subscriber computer 46 is normally embodied in conventional desktop or "tower" machine, but can alternatively be embodied in a portable or "laptop" computer, a handheld personal digital assistant (PDA), a cellular phone capable of browsing Web pages, a Internet terminal capable of browsing Web pages such as WEBTV, or other Web browsing devices.

Subscriber computer 46 is operatively coupled for communication with the server computer 38, typically via the Internet 41 through a phone connection using a modem and telephone line (not shown), in a standard fashion. The subscriber user of subscriber computer 46 will typically dial the user's Internet service provider (ISP) (not shown) through a modem and phone line to establish a connection between the subscriber computer 46 and the Internet 41. As described above, server computer 38 is operatively coupled for communication to the Internet 41. Since computers connected to the Internet 41, are themselves connected to each other, the Internet 41 establishes a network communication link between the subscriber computer 46 and the server computer 38. Generally, subscriber computer 46 and server computer 38 communicate using the TCP/IP (transfer control protocol/internet protocol). More specifically, the Web browser software 48 residing in the subscriber computer 46 communicates with the Web server software 40 residing in the server computer 38 via the HTTP protocol. However, other protocols for communication may also be utilized, including PPTP, NetBEUI over TCP/IP, and other appropriate network protocols.

The subscriber user of subscriber computer 46 requests positional data information by accessing the Web browser software 48 and contacting the Web server software 40 residing on server computer 38. Normally, a subscriber user will make a request to the server computer 38, which is received by Web server software 40. Web server software 40 validates the identity of subscriber user to ensure that the user requesting positional data information is the appropriate authorized user. This validation or authorization is normally carried out though standard challenge/response security authentication involving a user name and a password.

Once the subscriber user is validated, the Web server software 40 issues a query to the database software 42 for positional data of locator devices which the subscriber user is authorized to track or locate. Responsive to this query request, the database software 42 formulates a query to extract positional data from the tracking table in the database 44 and returns the query result to the Web server 40. After receiving the positional data from the database software 42, the Web server 40 merges the positional data with textual information and convolves the positional data with a map overlay to produce a image having the positional data superimposed on a map image. Various mapping software programs available in the art may be used for convolving the positional data information. The Web server 40 then transmits the textual and image positional data information in the form of hypertext markup language (HTML) to the subscriber user accessing the subscriber computer 46 for viewing thereon using the Web browsing software 48.

The HTML page presented to the subscriber may also include a Java™ applet which shows the positional information in a form of an image. The Java applet may dynamically depict the positional movement of the device by updating or refreshing the image of the positional information as the locator device 12 changes location. Various other means known in the art may be used to dynamically update the image of the positional information including, for example, a refresh rate which reloads new positional data images on the HTML page, or streaming video such as RealVideo™, Quicktime™, VDO™, MPEG or other like streaming video technologies. Such steaming videos depict the movement of the locator device over a map background.

Referring now to FIG. 2, a block diagram of an alternative locator device is shown and designation as 50. Locator device 50 carries out substantially the same functions as described above for locator device 12. To this end, the locator device 50 includes means for generating its positional data information connected to memory 52, a cellular modem 54 connected to the positional information generating means, a power supply 56, a control interface 58 connected to the positional information generating means, and power management module 59.

The means for generating positional data information comprises a GPS receiver 60 connected to an antenna 62, and a radio detection finding (RDF) unit 64 connected to the GPS receiver 60. The GPS receiving 60, like receiver 14, comprises standard circuit stage component for detecting and receiving radio frequency signal as in known in the art and carries other operation of scanning the input stream received by antenna 62. The receiver 60 demodulates GPS signals from the input stream into serial data for use by the RDF unit 64 to ascertain the positional data of locator unit 50 as described further below. The antenna 62, like antenna 16, comprises a RF transducer as in known in the art and is structured and configured to receive GPS signals produced by satellites 22a through 22n.

The RDF unit 64 comprises circuitry or like hardware having means for calculating its distance from visible GPS satellites 22a through 22n using the timing signals provided by the GPS satellites 22a through 22n. The calculating means of the RDF unit 64 comprises standard radiolocation calculation methods as is known in the art. The calculation means of the RDF unit 64 further formulates its positional data in the form of latitude, longitude, and altitude, from the above mentioned calculation methods. This positional data is maintained or recorded in a log in the memory 52 for later computation, and is communicated to the cellular modem 54 for further transmission as described below.

The power supply 56 is normally a battery supply and provides power to the various elements of the locator device 50, including the GPS receiver 60, the RDF unit 64, the power management module 59, the memory 52, and the cellular modem 54.

The controller interface 58, like control interface 21, carries out the operation of interpreting external commands issued by the user of locator device 50 and communicating such commands to the RDF unit 64 and the power management module 59. For example, when the user of locator device 50 activates the unit by pressing an activation switch (not shown) on the control interface, a signal is communicated to the power management module 59 to activate the power supply 58 which provides power to the corresponding elements of the device 50. Alternatively, a simple switch (not shown) connected to the power supply 56 could be provided at the control interface 58, to provide similar activation means.

The cellular modem 54, like cellular modem 24, comprises standard circuitry for cellular communication and modulation and includes an antenna 66 connected thereto. In an illustrative embodiment, the cellular modem 54 comprises a MOTOROLA® 505sd modem. The cellular modem 54 carries out the operation of transmitting the positional data received from the RDF unit 64 and communicating such positional data to the cellular provider 28.

The method and operation of the invention will be more fully understood by reference to the flow chart of FIG. 3. FIG. 3 illustrates generally the steps associated with the power management means of the invention. The order of steps as shown in FIG. 3 are only exemplary, and should not be considered limiting.

Referring now to FIG. 3, as well as FIG. 1, the method of managing or conserving power provided to the locator device 12 is shown.

At step 100, a user of the locator device 12 accessing the control interface 21 to signal an activation or "power on" signal. This activation signal is communicated from the control interface 21 to the power source 30. As described above, switches or other controls may be provided at the control interface 21 to allow the user to communicate control signals, such as "power on" to the locator device 12.

At step 110, responsive to this activation signal from the control interface 21, the power source 30 provides power to, inter alia, the wireless receiver 14, the CPU 18, the memory 20, and the cellular modem 24. The locator device is capable at running at a plurality of power levels including at least a "normal" level and a "low" level. At the "normal" level, the CPU 18 is running at its highest clock speed and power is provided at the highest level to all the elements of the locator device 12, including the wireless receiver 14, the CPU 18, the memory 18, and the cellular modem 24 among others. At the "low" level", the CPU 18 is running at a reduced clock speed which is normally half the speed of the highest clock speed, and one or more of the other elements are disabled, shutdown or otherwise provided less power by the power supply. More particularly, communication to the cellular provider 28 via the cellular modem 24 is temporarily interrupted. Normally the power delivered to the cellular modem 24 is interrupted.

Various other intermediary levels may be arranged to provide various power level consumption of the power source 30. The CPU 18 carries out the operation of the managing the power level in which the locator device 12 operates by communicating power level signals to the various elements of the locator device 12, including the power source 30, the wireless receiver 14, and the cellular modem. Initially, during the power on stage of step 110, the CPU 18 sets the locator device to operate at the "normal" level.

At step 120, the CPU 18 carries out an internal check of the locator device 12. The internal check comprises steps of checking the functionality of the wireless receiver 14, the memory 20, the CPU 18, the cellular modem 24, the power source 30, and the control interface 21, among other elements. The CPU 18 also ascertains its serial number or identification number, which may be preprogrammed into a circuit or like hardware device (not shown) such as a ROM chip, which connected to the CPU 18 and provided in the locator device 12. The CPU 18 also loads into memory 20 software or program means for computing positional data. The software may be provided internally in a circuit or like hardware (not shown) connected to the CPU 18 and provided in the locator device 12, or may alternatively be downloaded during this step from the cellular provider 28 via the cellular modem 24.

At step 130, the wireless receiver 14 attempts to synchronize with the visible GPS satellites 22a through 22n. The wireless receiver 14 examines the input stream received into the antenna 16 to ascertain synchronization signals or codes which are transmitted by the GPS satellites 22a through 22n. These synchronization codes are used by the receiver 14 to ascertain, among other things, the timing signals necessary to calculate positional data of the locator device 12. Normally, the locator device requires the timing signals from at least two (2) visible GPS satellites in order to calculate its positional data. As noted above, the term "visible" refers to the ability of the locator device 12 to receive synchronization signals, timing signals and other informational data from the GPS satellites 22a through 22n. The accuracy of the calculation of the positional data is proportional to the number of GPS satellites "visible" to the wireless receiver 14.

At step 140, the CPU 18 make a determination whether the wireless receiver 14 has synchronized with at least two visible GPS satellites as carried out during the synchronization step of 130. If the CPU 18 determines that the wireless receiver 14 has synchronized with at least two visible GPS satellites, steps 140 through 170 are carried out, otherwise steps 180 through 210 are carried out.

At step 150, the wireless receiver 14 carries out the steps of receiving input stream data from the antenna 16 and demodulating GPS signals into serial data as described above. This serial data is then communicated to the CPU 18 for further processing in step 160.

At step 160, the CPU 18 carries out the steps of receiving the serial data from wireless receiver 14 and computing positional data of the locator device 12, as described above. In general the software running on CPU 18 and in memory 20 calculates the distance between the locator device 12 and the GPS satellites synchronized with in step 130 or step 190 using the timing signals provided by the GPS satellites, and carries out standard radiolocation calculations to formulate the positional data which is the location of the locator device 12 relative to the positions of the GPS satellites 22a through 22n. The calculated positional data is internally stored in a log or record in the memory 20 for future comparison. Also at step 160, the CPU 18 compares the currently calculated positional data with the previously calculated positional data if any to ascertain the velocity or the relative "positional change" of locator device 12.

At step 170, the CPU 18 makes a determination of whether the relative "positional change" calculated in state 160 has increased. As noted above, the locator device 12 periodically communicates positional data to the cellular provider 28. In order to conserve the power source 30, the locator device 12 will decrease the rate of periodic transmission to cellular provider 28 when the locator device 12 is relatively stationary. Conversely, in order to provide accurate positional data to the server computer 38 via cellular provider 28, the rate of periodic transmission from locator device 12 to cellular provider 28 is increased when the relative "positional change" determined to have increased. If the locator device 12 remains at a relatively contact rate of velocity, then the rate of transmission remains relatively constant as well. If the "positional change" has increased, step 220 is carried out, otherwise, steps 230 is carried out.

At step 220, the periodic rate at which the cellular modem 24 transmits positional data to the cellular provider 28 is increased. This step provides the server computer 38 with an increased rate of positional data where the locator device is found to be moving rapidly. Steps 130 and 140 are carried out again.

At step 230, the CPU 18 makes a determination of whether the relative "positional change" calculated in step 160 has decreased. If the "positional change" has decreased, step 240 is carried out, otherwise, steps 130 and 140 are carried out again.

At step 240, the periodic rate at which the cellular modem 24 transmits positional data to the cellular provider 28 is decreased. This steps conserves power consumption in the locator device 12 when the device 12 is relatively stationary. Steps 130 and 140 and then repeated.

Steps 180 through 210 are carried out when the CPU 18 determines that the wireless receiver 14 has not synchronized with at least two visible GPS satellites in step 140.

At step 180, the locator device 12 is set to the "low" level of operation described above in order to conserve the power usage drawn from the power source 30. At this level the CPU 18 runs at a reduced clock speed which is normally half of the highest clock speed. The power to the cellular modem is also terminated or otherwise reduced. Additionally, cellular communication between cellular modem 24 and the cellular provider 28 is temporarily interrupted.

At step 190, the locator device 12 attempts to synchronize with visible GPS satellites using the same steps as carried out in step 130.

At step 200, the CPU 18 makes a determination whether the wireless receiver 14 has synchronized with at least two visible GPS satellites during the synchronization step of 190. If the CPU 18 determines that the wireless receiver 14 has synchronized with at least two visible GPS satellites, step 210 is carried out, otherwise steps 190 and 200 are carried out again.

At step 210, the locator device 12 is restored to the "normal" level of operation described above. At this level, the CPU 18 operates at its fastest clock speed, and power is delivered at the "normal" to the elements of locator device 12 as described earlier in the power on step 110. Cellular communication between cellular modem 24 and cellular provider is also resumed. Steps 150 through 170 are then carried out.

Accordingly, it will be seen that this invention provides a tracking and locating system and method which provides for a lightweight and portable tracking locator device, which is easily transferable from user to user or object to object, which provides power saving and conserving features associated with the locator device, and which further provides positional information of such locator devices in the form of hypertext markup language pages viewable on the Internet. Although the description above contains many specificities, these should not be construed as limiting the scope of the invention but as merely providing an illustration of the presently preferred embodiment of the invention. Thus the scope of this invention should be determined by the appended claims and their legal equivalents.

What is claimed is:

1. A locator system for a portable locator device comprising:
the locator device including
an antenna operable to receive signals from a plurality of transmitters for use in radiolocation,
a CPU configured to transmit the radiolocation-data in a periodic manner to a server computer,
a wireless communication interface operable to transmit radiolocation-data; and
the server computer having a CPU and computer readable medium storing a server-software program, the software program configured to
receive the radiolocation-data transmitted by the locator device,
receive a request from a client for a position data of the locator device, and
provide the position data based on the radiolocation data to the client in response to the request from the client,
wherein the client receives the position data without any communication between the client and the locator device.

2. The locator system of claim 1, wherein the CPU of the locator device is further configured to compute the positional data of the portable locator device and the radiolocation-data includes the positional data of the portable locator device.

3. The locator system of claim 1, wherein the server-software program is further configured to compute the positional data of the portable locator device based on the radiolocation-data received from the locator device.

4. A method for tracking and locating a portable locator device comprising the steps of:
receiving a signal for use in radiolocation at the portable locator device;
transmitting radiolocation-data through a wireless communication network from the portable locator device to a server computer in a periodic manner;
computing a present location of the locator device using the radiolocation data;
at the server, receiving a request from a client for the present location of the locator device;
providing the present location to the client by the server,
wherein the client receives the present location without any communication between the client and the locator device.

5. The method of claim 4, further comprising the step of receiving a plurality of radio location signals at the portable locator device wherein the present location of the portable locator device is computed at the portable locator device using the plurality of radio location signals, and the radiolocation-data transmitted from the portable locator device includes the present location of the portable locator device.

6. The method of claim 4, further comprising the step of receiving a plurality of radio location signals at the portable locator device wherein the radiolocation data transmitted from the portable locator device includes information from the radiolocation signals and the present location of the portable locator device is computed at the server using the radiolocation data transmitted from the portable locator device.

7. A locator system for a portable locator device comprising:
- a portable locator device, the locator device including
  - an antenna operable to receive signals from a plurality of transmitters for use in radiolocation,
  - a CPU configured to transmit the radiolocation-data in a periodic manner to a server computer,
  - a wireless communication interface operable to transmit radiolocation-data; and
- the server computer having a CPU and computer readable medium storing a server-software program, the software program configured to
  - receive the radiolocation-data transmitted by the locator device,
  - receive a request from a client for a position data of the locator device, and
  - provide the position data based on the radiolocation data to the client in response to the request from the client,
- wherein the locator device is not provided with information regarding the request for the position data of the locator device.

8. The locator system of claim 7, wherein the CPU of the locator device is further configured to compute the positional data of the portable locator device and the radiolocation-data includes the positional data of the portable locator device.

9. The locator system of claim 7, wherein the server-software program is further configured to compute the positional data of the portable locator device based on the radiolocation-data received from the locator device.

10. A method for tracking and locating a portable locator device comprising the steps of:
- receiving a signal for use in radiolocation at the portable locator device;
- transmitting radiolocation-data through a wireless communication network from the portable locator device to a server computer in a periodic manner;
- computing a present location of the locator device using the radiolocation data;
- at the server, receiving a request from a client for the present location of the locator device;
- providing the present location to the client by the server,
- wherein the locator device is not provided with any information regarding the request from the client and the provision of the present location to the client.

11. The method of claim 10, further comprising the step of receiving a plurality of radiolocation signals at the portable locator device wherein the present location of the portable device is computed at the portable locator device using the plurality of radiolocation signals, and the radiolocation-data transmitted from the portable locator device includes the present location of the portable locator device.

12. The method of claim 10, further comprising the step of receiving a plurality of radiolocation signals at the portable locator device wherein the radiolocation data transmitted from the portable locator device includes information from the radiolocation signals and the present location of the portable locator device is computed at the server using the radiolocation data transmitted from the portable locator device.

* * * * *